(12) United States Patent
Nakazato

(10) Patent No.: US 10,606,206 B2
(45) Date of Patent: Mar. 31, 2020

(54) IMAGE FORMING APPARATUS

(71) Applicant: Oki Data Corporation, Tokyo (JP)

(72) Inventor: Kyosuke Nakazato, Tokyo (JP)

(73) Assignee: Oki Data Corporation, Tokyo (JP)

(*) Notice: Subject to any disclaimer, the term of this patent is extended or adjusted under 35 U.S.C. 154(b) by 191 days.

(21) Appl. No.: 15/786,257

(22) Filed: Oct. 17, 2017

(65) Prior Publication Data

US 2018/0120750 A1 May 3, 2018

(30) Foreign Application Priority Data

Oct. 27, 2016 (JP) .................. 2016-210243

(51) Int. Cl.
| | |
|---|---|
| G03G 15/00 | (2006.01) |
| B41J 11/00 | (2006.01) |
| B41J 11/70 | (2006.01) |
| B41J 11/66 | (2006.01) |
| B41J 15/04 | (2006.01) |
| H04N 1/00 | (2006.01) |

(52) U.S. Cl.
CPC ........ G03G 15/6558 (2013.01); B41J 11/006 (2013.01); B41J 11/0095 (2013.01); B41J 11/663 (2013.01); B41J 11/70 (2013.01); B41J 15/04 (2013.01); G03G 15/5012 (2013.01); G03G 15/602 (2013.01); G03G 15/652 (2013.01); G03G 15/70 (2013.01); H04N 1/0032 (2013.01); B65H 2404/10 (2013.01); G03G 2215/00814 (2013.01)

(58) Field of Classification Search
CPC .................................................... G03G 15/70

USPC ............................................................ 399/21
See application file for complete search history.

(56) References Cited

U.S. PATENT DOCUMENTS

| | | | | | |
|---|---|---|---|---|---|
| 4,786,041 | A | * | 11/1988 | Acquaviva | G03G 15/5012 271/10.11 |
| 2004/0126166 | A1 | * | 7/2004 | Miyake | G03G 15/703 400/74 |
| 2008/0202301 | A1 | * | 8/2008 | Hayashi | B26D 5/20 83/63 |
| 2011/0123245 | A1 | * | 5/2011 | Gocho | B26D 5/28 400/621 |

(Continued)

FOREIGN PATENT DOCUMENTS

JP   H09-43918 A   2/1997

Primary Examiner — Anthony H Nguyen
(74) Attorney, Agent, or Firm — Muncy, Geissler, Olds & Lowe, P.C.

(57) ABSTRACT

An image forming apparatus carrying a medium along a carrying path in a medium carrying direction includes a cutting part cutting the medium carried along the carrying path, a carrying part carrying and ejecting the medium cut by the cutting part, being located at downstream side from the cutting part, a medium jam detection part detecting a jamming of the medium by the carrying part, a remaining medium detection part detecting whether the medium remains in the carrying part, a recovery process selection part that selects a recovery process according to a remaining state of the medium, which is determined by the remaining medium detection part, and a controller that, when the medium jam detection part has detected the jamming of the medium, ejects the remaining medium based on the recovery process selected by the recovery process selection part.

8 Claims, 9 Drawing Sheets

(56) References Cited

U.S. PATENT DOCUMENTS

| | | | | |
|---|---|---|---|---|
| 2011/0211007 A1* | 9/2011 | Okamoto | ............... | B41J 11/006 |
| | | | | 347/16 |
| 2013/0100219 A1* | 4/2013 | Tokisawa | ............... | B41J 11/006 |
| | | | | 347/102 |
| 2014/0241737 A1* | 8/2014 | Shirasaka | .......... | G03G 15/6552 |
| | | | | 399/20 |
| 2015/0309465 A1* | 10/2015 | Matsumoto | ............ | G03G 15/70 |
| | | | | 399/21 |
| 2015/0316887 A1* | 11/2015 | Zhu | ........................ | G03G 15/70 |
| | | | | 399/21 |
| 2016/0216674 A1* | 7/2016 | Numazu | ................ | B65H 29/70 |

* cited by examiner $Lth2 = D2 + \theta 2 * P$

IMAGE FORMING APPARATUS

TECHNICAL FIELD

This invention relates to an image forming apparatus that forms an image on a medium.

BACKGROUND

In a conventional image forming apparatus, when a roll sheet as a medium is jammed in a state where the roll sheet is not cut, the roll sheet is cut to save its user's work to cut the roll sheet (e.g., see Patent Document 1).

RELATED ART

[Patent Doc. 1] JP Laid-Open Publication H9-43918

However, when the medium is jammed, the conventional technology ends its process after cutting the medium, therefore the user needs to open the carrying route of the medium and remove the jammed medium, burdening the user. This invention has attempted to resolve such a problem, and its purpose is to reduce the user's burden when the medium is jammed.

SUMMARY

An image forming apparatus disclosed in the application, carrying a medium along a carrying path in a medium carrying direction from an upstream side to an downstream side includes a cutting part that cuts the medium carried along the carrying path, a carrying part that carries and ejects the medium cut by the cutting part, being located at the downstream side from the cutting part, a medium jam detection part that detects a jamming of the medium to be ejected by the carrying part, a remaining medium detection part that detects whether or not the medium remains in the carrying part, the medium remaining being defined as a remaining medium, a recovery process selection part that selects a recovery process according to a remaining state of the medium, which is determined by the remaining medium detection part, and a controller that, when the medium jam detection part has detected the jamming of the medium, ejects the remaining medium based on the recovery process selected by the recovery process selection part.

This invention made in this manner has an efficacy of reducing the user's burden when the medium is jammed.

BRIEF DESCRIPTIONS OF THE DRAWINGS

DETAILED DESCRIPTIONS OF THE PREFERRED EMBODIMENTS

Below, an embodiment of the image forming apparatus by this invention is explained referring to drawings.

Figure 1:
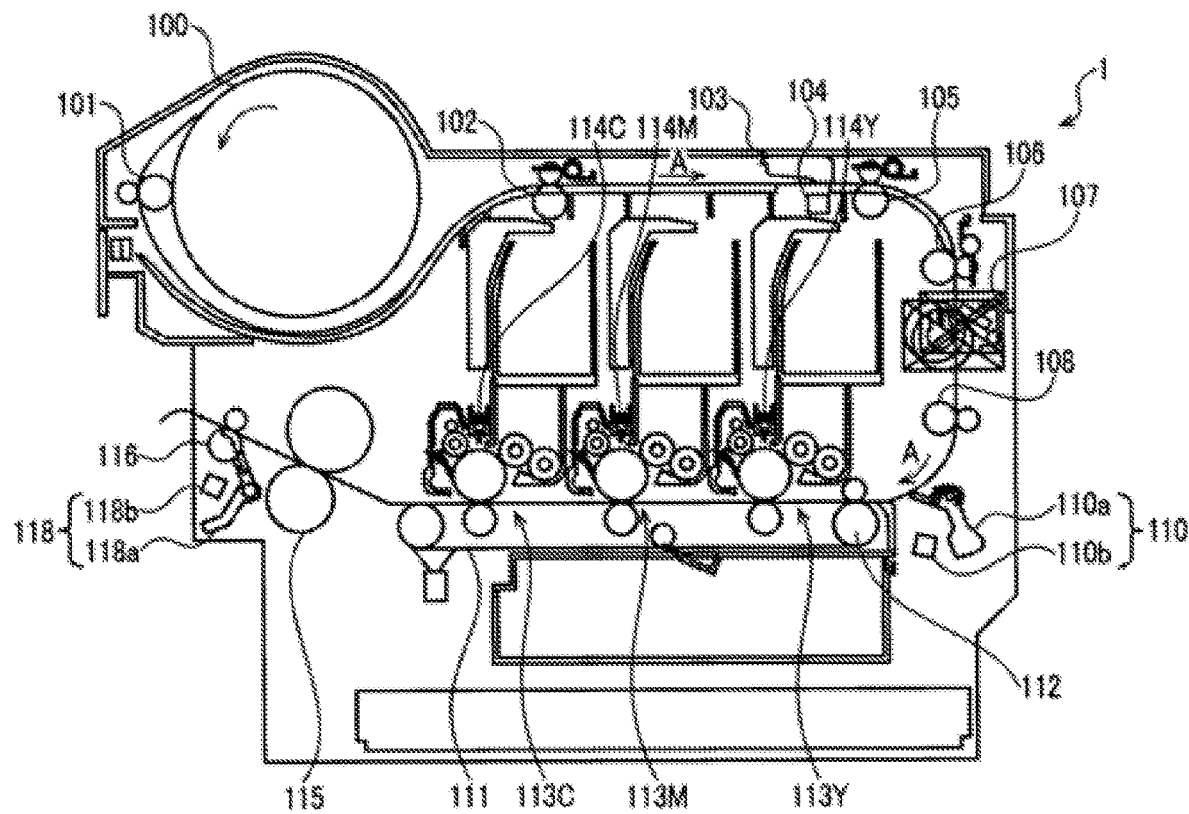
FIG. 1 is a schematic cross-sectional side view showing the configuration of a POS printer in an embodiment.

FIG. 1 is a schematic cross-sectional side view showing the configuration of a POS printer in the embodiment.

In FIG. 1, the POS (Point Of Sale) printer 1 as the image forming apparatus has a medium 100, sheet feeding roller pairs 101, 102, 105, and 106, a PE sensor 104, a cutter unit 107, a feed roller pair 108, a WR sensor 110, a transfer belt 111, a belt roller pair 112, ID units 113Y, 113M, and 113C, LED heads 114Y, 114M, and 114C, a fuser roller pair 115, an ejection roller pair 116, and an ejection sensor 118.

The medium 100 is a transfer material accommodated wound in a roll shape, to which toner images as developer images are transferred.

The sheet feeding roller pairs 101, 102, 105, and 106 as sheet feeding parts rotate by a drive source such as a motor and form a medium sheet feeding and carrying route that sandwiches and carries the medium 100. The sheet feeding roller pairs 101, 102, 105, and 106 are disposed in the upstream side of the cutter unit 107 in a medium carrying direction indicated with an arrow A in the figure, and sequentially arranged in the order of the sheet feeding roller pairs 101, 102, 105, and 106 from the upstream side in the medium carrying direction.

The PE sensor 104 is disposed between the sheet feeding roller pair 102 and the sheet feeding roller pair 105, and detects the presence or absence of the medium 100 being carried. This PE sensor 104 is a photointerrupter that is configured in one unit with a lever 103 for example, disposed so that the carried medium 100 rotates the lever 103, and detects that the light running along the optical axis is either blocked or transmitted by the lever 103 that rotates.

The cutter unit 107 as a cutting part is a rotary cutter disposed in the downstream side of the sheet feeding roller pair 106 in the medium carrying direction, and cuts the medium 100 fed by the sheet feeding roller pair 106 etc. without stopping it through rotating by a drive source such as a motor. The feed roller pair 108 is disposed in the downstream side of the cutter unit 107 in the medium carrying direction, rotates by a drive source such as a motor, and forms a carrying part that carries the medium 100 cut by the cutter unit 107.

The WR sensor 110 as a first sensor is disposed in the downstream side of the cutter unit 107 and the feed roller pair 108 in the medium carrying direction, and detects the presence or absence of the medium 100 being carried. This WR sensor 110 is a photointerrupter that is configured of a lever 110a and a light receiving and emitting part 110b in one unit, is disposed so that the carried medium 100 rotates the lever 110a, and detects that the light running along the optical axis of the light receiving and emitting part 110b is either blocked or transmitted by the lever 110a that rotates.

The transfer belt 111 is disposed opposing the ID units 113Y, 113M, and 113C in the downstream side of the WR sensor 110 in the medium carrying direction, forms the carrying part that carries the medium 100 carried up by the feed roller pair 108, and transfers to the medium 100 toner images formed in the ID units 113Y, 113M, and 113C with high voltages applied.

The belt roller pair 112 rotates by a drive source such as a motor to rotate the transfer belt 111 that is stretched. Each of the ID units 113Y, 113M, and 113C has a photosensitive drum as an image carrier that is disposed rotatably opposing the transfer belt 111. The ID units 113Y, 113M, and 113C form toner images of yellow (Y), magenta (M), and cyan (C) colors, respectively, on their respective photosensitive drums.

The LED (Light Emitting Diode) heads 114Y, 114M, and 114C are exposure means that are disposed opposing the ID units 113Y, 113M, and 113C, respectively, and selectively radiate light onto the photosensitive drums of the ID units 113Y, 113M, and 113C, respectively, to form electrostatic latent images. The electrostatic latent images formed on the photosensitive drums are provided with toner as a developer to form the toner images.

The fuser roller pair 115 is disposed in the downstream side of the transfer belt 111 and the ID units 113Y, 113M, and 113C in the medium carrying direction and fuses with heat and a pressure the toner images transferred to the medium 100. Also, the fuser roller pair 115 rotates by a drive source such as a motor to carry the medium 100.

The ejection sensor 118 as a second sensor is disposed in the downstream side of the WR sensor 110 and the fuser roller pair 115 in the medium carrying direction, and detects the presence or absence of the medium 100 carried up by the fuser roller pair 115, that is the medium 100 to be ejected. This ejection sensor 118 is a photointerrupter that is configured of a lever 118a and a light receiving and emitting part 118b in one unit for example, is disposed so that the medium 100 carried up rotates the lever 118a, and detects that the light running along the optical axis of the light receiving and emitting part 118b is blocked or transmitted by the lever 118a that rotates.

The ejection roller pair 116 is disposed in the downstream side of the ejection sensor 118 in the medium carrying direction, rotates by a drive source such as a motor, and ejects the medium 100 to the outside of the apparatus. The feed roller pair 108, the transfer belt 111, the fuser roller pair 115, and the ejection roller pair 116 as the carrying part form a medium carrying route to eject the medium cut by the cutter unit 107 to the outside of the apparatus.

Figure 2A:
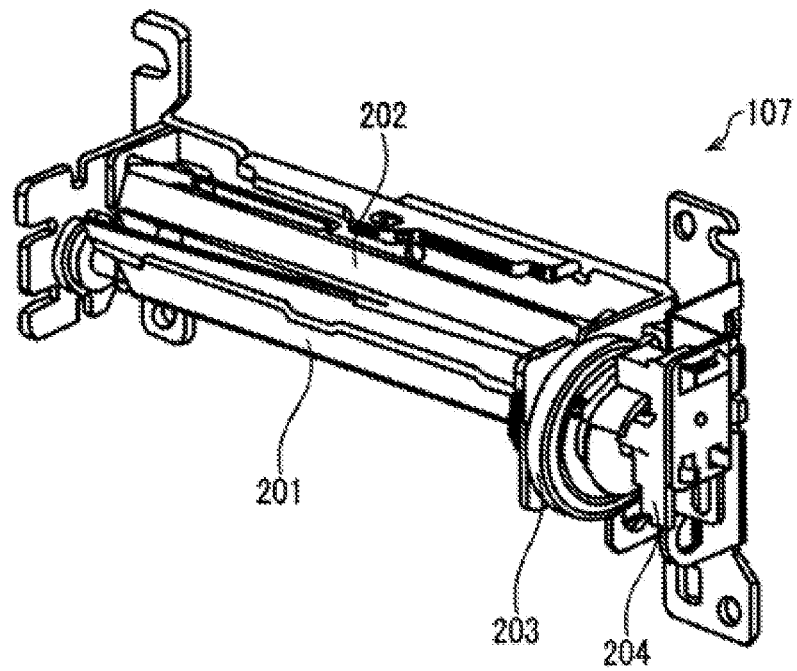
FIGS. 2A and 2B are explanatory drawings showing the configuration of a cutter unit in the embodiment.
Figure 2B:
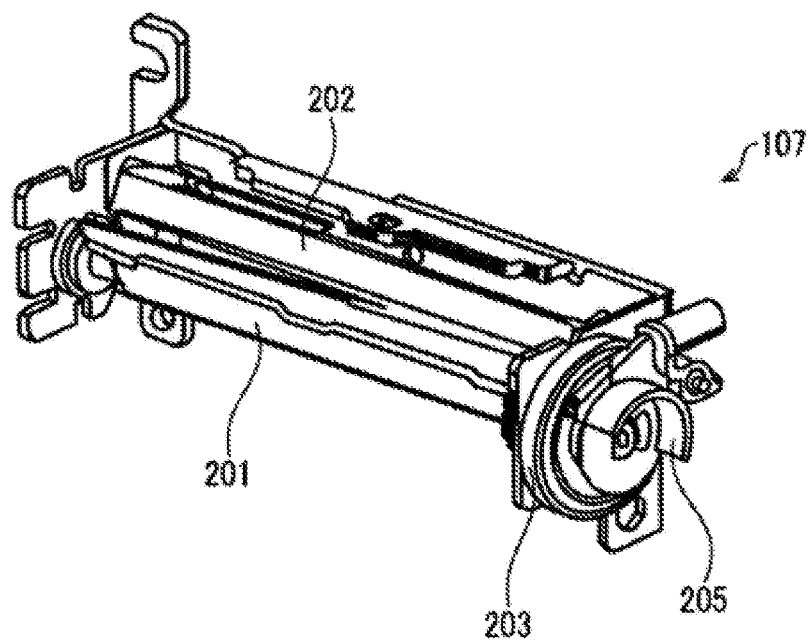

FIGS. 2A and 2B are explanatory drawings showing the configuration of the cutter unit in the embodiment, where FIG. 2A is a perspective view of the whole cutter unit, and FIG. 2B a perspective view of the cutter unit with a cutter HP sensor removed.

As shown in FIG. 2A, the cutter unit 107 has a rotary blade 201, a fixed blade 202, and the cutter HP sensor 204.

The rotary blade 201 is rotatably supported to a frame and connected to a cutter gear 203. The cutter gear 203 is connected to a drive source such as a motor through a gear array, and by the gear array and the cutter gear 203 rotating, the rotary blade 201 rotates. The fixed blade 202 is disposed opposing the rotary blade 201 and fixed to the frame. By this fixed blade 202 and the rotary blade 201 that rotates intersecting with each other, a medium sandwiched by the fixed blade 202 and the rotary blade 201 is cut.

The cutter HP sensor 204 is a sensor to detect the position of the rotary blade 201. As shown in FIG. 2B, the cutter gear 203 is provided with a light blocking plate 205, and the light blocking plate 205 is disposed so as to block or transmit the light between a light emitting part and a light receiving part of the cutter HP sensor 204. The cutter HP sensor 204 is a photointerrupter to detect that the light running along the optical axis between the light emitting part and the light receiving part is either blocked or transmitted by the light blocking plate 205 that rotates. When the light blocking plate 205 is detected, the cutter HP sensor 204 outputs a High signal, and when the light blocking plate 205 is not detected, it outputs a Low signal.

Figure 3:
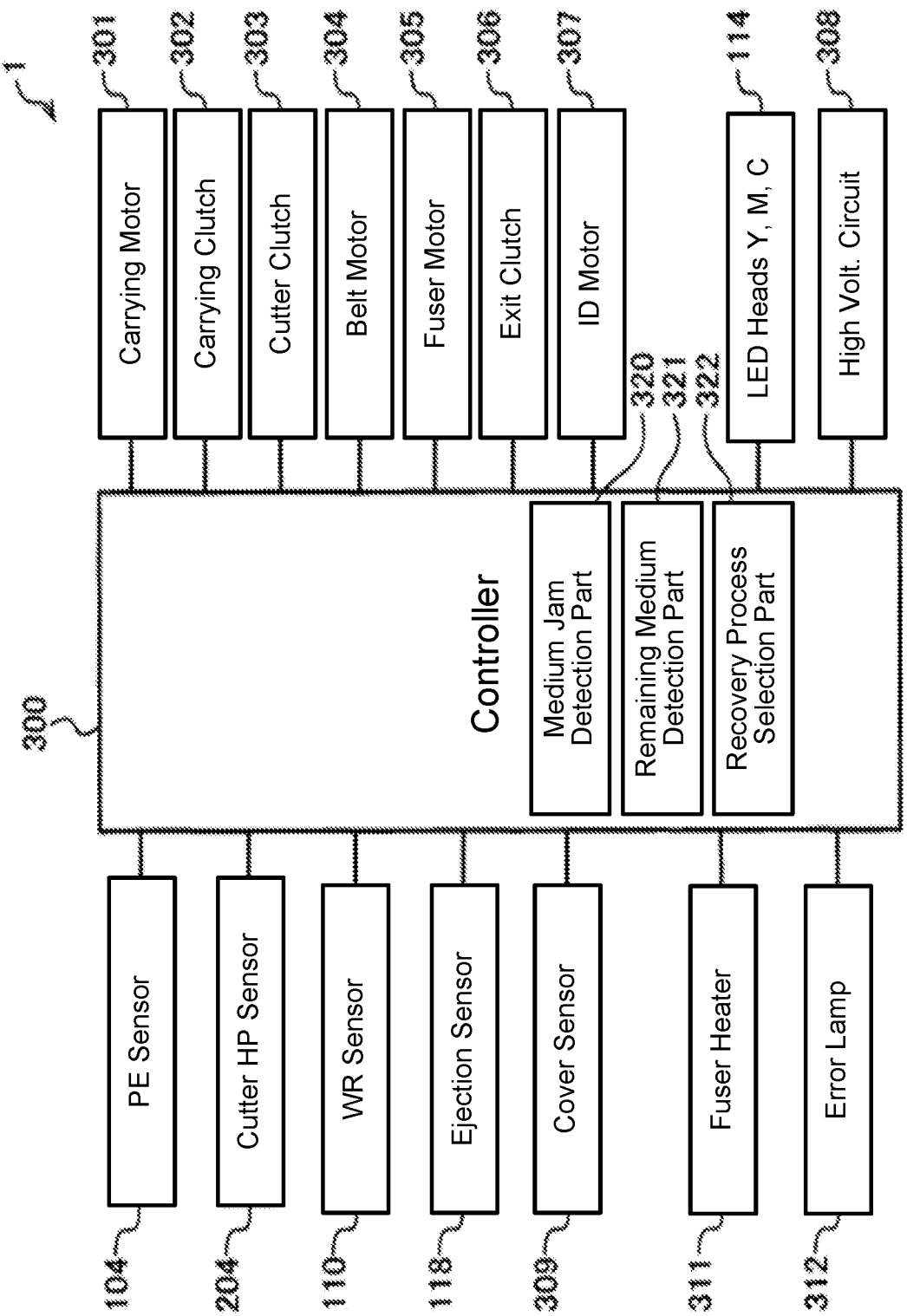
FIG. 3 is a block diagram showing the control configuration of the POS printer in the embodiment.

FIG. 3 is a block diagram showing the control configuration of the POS printer in the embodiment. In FIG. 3 the POS printer 1 has a controller 300, a carrying motor 301, a carrying clutch 302, a cutter clutch 303, a belt motor 304, a fuser motor 305, an exit clutch 306, an ID motor 307, a high voltage circuit 308, a cover sensor 309, a fuser heater 311, and an error lamp 312.

Also, the POS printer 1 has the PE sensor 104, the WR sensor 110, the LED heads 114Y, 114M, and 114C, the ejection sensor 118, and the cutter HP sensor 204 mentioned above.

The controller 300 is configured of a control means such as a CPU and a memory means such as memory, and controls the operation of the whole image forming apparatus 1 based on a control program (software) stored in the memory means.

The carrying motor 301 is a motor that is connected to the controller 300 and rotates the sheet feeding roller pairs 101, 102, 105, and 106, and the feed roller pair 108 by the control of the controller 300. The carrying motor 301 has its rotation speed controlled by a control signal (e.g., the frequency of the output pulse) and its rotation amount controlled by another control signal (e.g., the number of output pulses) output from the controller 300.

The carrying clutch 302 is connected to the controller 300 and controlled by the controller 300. The carrying clutch 302 is connected through a gear array between the carrying motor 301 and the sheet feeding roller pairs 101, 102, 105, and 106, and cuts off or connects the rotational drive of the carrying motor 301 to be transmitted to the sheet feeding roller pairs 101, 102, 105, and 106. Once the rotational drive of the carrying motor 301 is transmitted to the sheet feeding roller pairs 101, 102, 105, and 106 by this carrying clutch 302, the sheet feeding roller pairs 101, 102, 105, and 106 rotate.

Note that the feed roller pair 108 is not connected to the carrying clutch 302.

The cutter clutch 303 is connected to the controller 300 and controlled by the controller 300. The cutter clutch 303 is connected through a gear array between the carrying motor 301 and the cutter gear 203 (rotary blade 201) of the cutter unit 107 shown in FIG. 2, and cuts off or connects the rotational drive of the carrying motor 301 to be transmitted to the cutter gear 203. Once the rotational drive of the carrying motor 301 is transmitted to the cutter gear 203 by this cutter clutch 303, the rotary blade 201 of the cutter unit 107 shown in FIG. 2 rotates.

Note that the feed roller pair 108 is not connected to the carrying clutch 302 but directly connected to the carrying motor 301 through a gear array and rotates by the carrying motor 301 rotating.

The belt motor 304 is a motor (e.g., a brushless DC motor) that is connected to the controller 300 and rotates the belt roller pair 112 shown in FIG. 1 by the control of the controller 300. The belt motor 304 is connected to the belt roller pair 12 through a gear array.

The fuser motor 305 is a motor (e.g., a brushless DC motor) that is connected to the controller 300 and rotates the fuser roller pair 115 shown in FIG. 1 by the control of the controller 300. The fuser motor 305 is connected to the fuser roller pair 115 through a gear array.

The exit clutch 306 is connected to the controller 300 and controlled by the controller 300. The exit clutch 306 is connected through a gear array between the fuser motor 305 and the ejection roller pair 116 shown in FIG. 1, and cuts off or connects the rotational drive of the fuser motor 305 to be transmitted to the ejection roller pair 116. Once the rotational drive of the fuser motor 305 is transmitted to the ejection roller pair 116 by this exit clutch 306, the ejection roller pair 116 rotates.

The ID motor 307 is a motor (e.g., a brushless motor) that is connected to the controller 300 and rotates rollers such as the photosensitive drums of the ID units 113Y, 113M, and 113C shown in FIG. 1 by the control of the controller 300. The ID motor 307 is connected to the ID units 113Y, 113M, and 113C through a gear array.

The high voltage circuit 308, the LED heads 114Y, 114M, and 114C, and the fuser heater 311 are connected to the controller 300 and perform electrophotographic processes such as charging, exposure, development, transfer, and fusing by the control of the controller 300. For example, the high voltage circuit 308 performs the applications of a charging voltage, a development voltage, and a transfer voltage. The LED heads 114Y, 114M, and 114C perform exposures. The fuser heater 311 performs the application of heat to the fuser roller pair 115 shown in FIG. 1.

The cover sensor 309, the PE sensor 104, the WR sensor 110, the ejection sensor 118, and the cutter HP sensor 204 are connected to the controller 300 and input various kinds of information by the control of the controller 300. The cover sensor 309 detects opening or closing of a cover installed on the image forming apparatus 1.

The error lamp 312 is connected to the controller 300 and turns on or off by the control of the controller 300. This error lamp 312 notifies the user of the occurrence of an abnormality to the POS printer 1 by lighting either up or off. Note that the error lamp 312 is disposed on the operation part of the POS printer 1 shown in FIG. 1.

Also, the controller 300 has a medium jam detection part 320, a remaining medium detection part 321, and a recovery process selection part 322.

The medium jam detection part 320 detects, based on the output of the ejection sensor 118, jamming of a medium that is carried and ejected to the outside of the apparatus by the feed roller pair 108, the transfer belt 111, the fuser roller pair 115, and the ejection roller pair 116 shown in FIG. 1 as the carrying part. If the ejection sensor 118 detects that the trailing edge of the medium that reached the ejection sensor 118 has not passed within predetermined time, the medium jam detection part 320 judges that jamming of the medium (hereafter called as "jam") has occurred in the ejection sensor 118.

The remaining medium detection part 321 detects a medium remaining in the carrying part formed by the feed roller pair 108, the transfer belt 111, the fuser roller pair 115, and the ejection roller pair 116 in FIG. 1. As well as detecting the remaining medium based on the outputs of the WR sensor 110 and the ejection sensor 118 disposed in the carrying part, the remaining medium detection part 321 also compares the number of sheets of the medium that passed the WR sensor 110 and the number of sheets of the medium that passed the ejection sensor 118, and if the number of sheets of the medium that passed the WR sensor and the number of sheets of the medium that passed the ejection sensor 118 do not match, determines that the medium (or one or more sheets) remains in the carrying part, detecting that the medium remains in the carrying part.

The recovery process selection part 322 selects a recovery process according to the remaining state of the medium detected by the remaining medium detection part 321, and selects either a process to eject the medium or a process to cut and eject the medium as the recovery process.

By the controller 300 configured in this manner, if the medium jam detection part 320 detects a medium jam, the remaining medium is ejected based on the recovery process selected by the recovery process selection part 322 according to the remaining state of the medium detected by the remaining medium detection part 321.

The actions of the above-mentioned configuration are explained.

First, the outline of the print operation of the POS printer is explained based on FIGS. 1 and 3.

The user is supposed to set the medium 100 to the POS printer 1 by having the leading edge of the medium 100 sandwiched by the sheet feeding roller pair 101.

The controller 300 of the POS printer 1 controls the carrying clutch 302 to connect the carrying motor 301 with the sheet feeding roller pairs 101, 102, 105, and 106 and the feed roller pair 108, and drives the carrying motor 301 to carry the medium 100 to the transfer belt 111 by the sheet feeding roller pairs 101, 102, 105, and 106, and the feed roller pair 108.

The controller 300 drives the belt motor 304 to rotate the transfer belt 111, and also drives the ID motor 307 to rotate rollers such as the photosensitive drums of the ID units 113Y, 113M, and 113C to transfer the toner images formed in the ID units 113Y, 113M, and 113C to the medium 100 carried by the transfer belt 111.

Also, the controller 300 controls the fuser heater 311 to apply heat to the fuser roller pair 115, and controls the exit clutch 306 to connect the fuser motor 305 with the ejection roller pair 116.

The controller 300 drives the fuser motor 305 to have the fuser roller pair 115 carry the medium 100 that was carried by the ID units 113Y, 113M, and 113C and the transfer belt 111 and to which the toner images were transferred, and also fuse the toner images to the medium 100.

The medium 100 that was carried by the fuser roller pair 115 and to which the toner images were fused is carried and ejected to the outside of the apparatus by the ejection roller pair 116.

After detecting the passage of the medium 100 by the ejection sensor 118, the controller 300 rotates the ejection roller pair 116 by a prescribed amount and ends the print operation.

Also, while driving the carrying motor 301, the controller 300 controls the cutter clutch 303 to cut the medium 100 into a prescribed medium length by the cutter unit 107.

In this embodiment, the controller 300 stops the leading edge of the medium 100 that was carried by the sheet feeding roller pairs 101, 102, 105, and 106 and is not cut at a sheet feeding completion position in the upstream side of the feed roller pair 108 in the medium carrying direction.

Once the distance between the leading edge of the stopped medium 100 and the trailing edge of the preceding medium 100 (hereafter called "inter-sheet distance") becomes a prescribed distance, the controller 300 controls the carrying clutch 302 to start carrying the stopped medium 100, and controls the cutter clutch 303 to cut the medium 100 to a prescribed medium length by the cutter unit 107.

Once the leading edge of the following medium 100 is carried to the sheet feeding completion position, the controller 300 controls the carrying clutch 302 to stop the leading edge of the medium 100 at the sheet feeding completion position.

The controller 300 transfers the toner images formed in the ID units 113Y, 113M, and 113C by the transfer belt 111, and fuses the toner images by the fuser roller pair 115, thereby performing the print operation.

In this manner, the controller 300 performs the print operation by cutting the medium 100 into the prescribed length.

Figure 4:
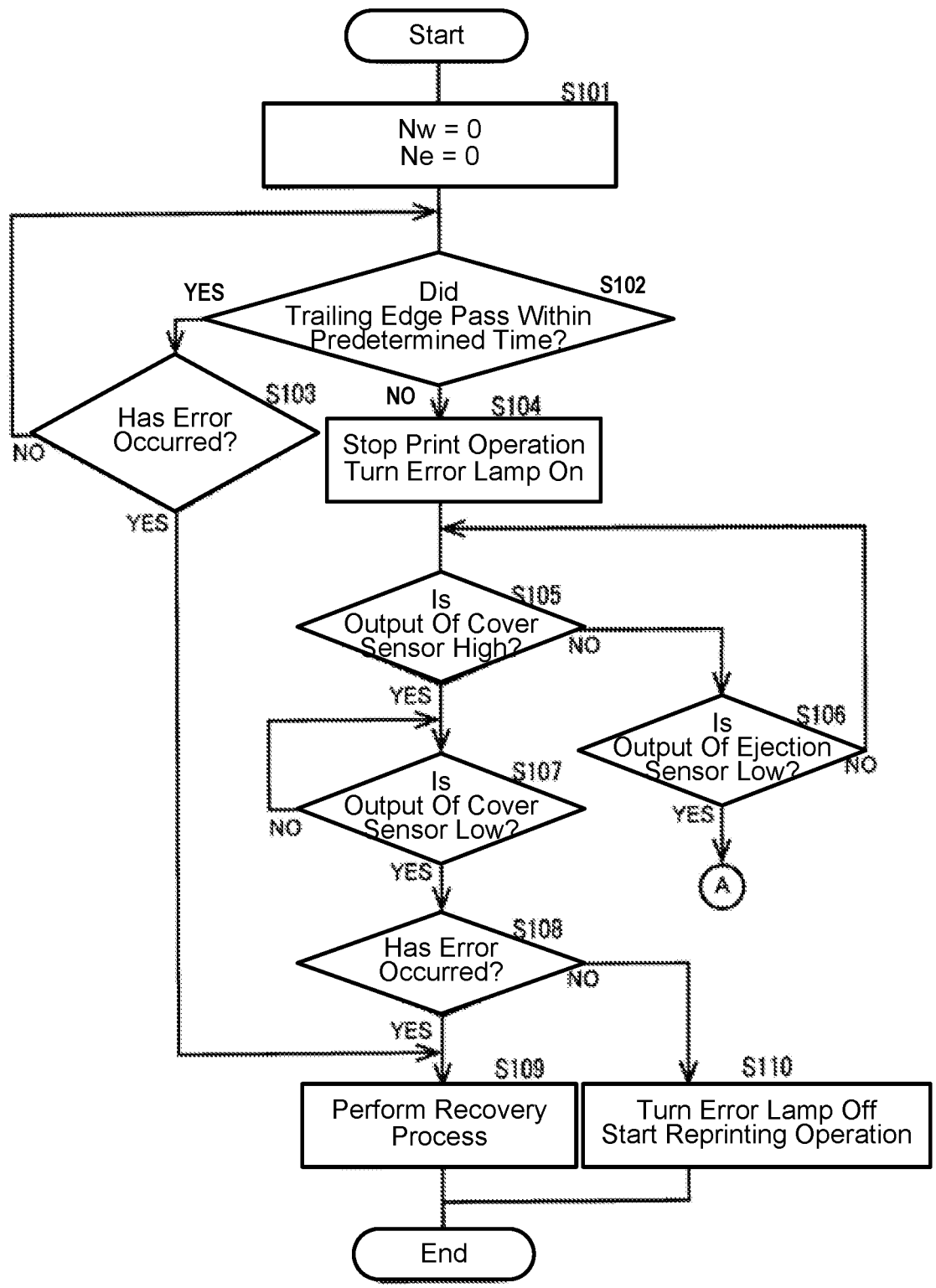
FIG. 4 is a flow chart showing the flow of a recovery process when an abnormality has occurred in the embodiment.

Next, the recovery process performed by the POS printer when a medium jam has occurred is explained referring to FIGS. 1 and 3 according to steps indicated with S in a flow chart showing the flow of the recovery process upon an abnormality occurrence in the embodiment in FIG. 4.

S101: Before starting the print operation, the controller 300 of the POS printer 1 initializes to "0" a WR sensor passed number of sheets Nw that is a variable to store the number of sheets of the medium that passed the WR sensor 110, and an ejection sensor passed number of sheets Ne that is a variable to store the number of sheets of the medium that passed the ejection sensor 118. Note that the WR sensor passed number of sheets Nw and the ejection sensor passed number of sheets Ne are stored in a memory means such as memory, store the number of sheets of the medium that passed the WR sensor 110 or the ejection sensor 118, and are updated at any time by the controller 300 until the printing is completed.

The controller 300 of the POS printer 1 controls the carrying motor 301, the carrying clutch 303, the belt motor 304, the fuser motor 305, the exit clutch 306, the ID motor 307, the high voltage circuit 308, the fuser heater 311, etc. to perform the print operation.

S102: The medium jam detection part 320 of the controller 300 judges whether a medium jam (an ejection sensor jam) has been detected by the ejection sensor 118, upon judging that a jam has been detected, proceeds to S104, and upon judging that no jam has been detected, proceeds to S103.

Here, if the trailing edge of the medium that reached the ejection sensor 118 has not passed within the predetermined time, the medium jam detection part 320 judges that an ejection sensor jam has occurred. Note that the predetermined time is time required for the medium having a medium length X to pass the ejection sensor 118 with time for a leeway length α (hereafter called "margin a") to pass added. The medium length X may be input from the user through a printer driver when printing. It may be automatically selected among pre-settled data referring to an image size to be printed.

S103: Having judged that no ejection sensor jam has been detected by the medium jam detection part 320, the controller 300 judges whether any other apparatus abnormality (hereafter called "error") than the ejection sensor jam has occurred or not, upon judging that it has not occurred, proceeds to S102, and upon judging that it has occurred, proceed to S109 for performing a recovery process that is designed to deal with various types of errors. S104: On the other hand, having judged that an ejection sensor jam has been detected by the medium jam detection part 320, the controller 300 stops the print operation and turns the error lamp 312 on. With respect the above error, a write sensor jam, which is caused with the same mechanism as the ejection sensor jam, a motor lock error, which is caused with increasing load of the motor, or other similar errors may fall within the error.

Note that the controller 300 turns off the carrying motor 301, the carrying clutch 302, the cutter clutch 303, the belt motor 304, the fuser motor 305, the exit clutch 306, the ID motor 307, the high voltage circuit 308, the fuser heater 311, etc. to stop the print operation.

S105: The controller 300 judges whether the output of the cover sensor 309 of the POS printer 1 is High or not (whether the cover is opened or not), upon judging that the output of the cover sensor 309 is High (the cover is opened), proceeds to S107 for detecting that the output of the cover sensor 309 is Low (the cover is closed), and upon judging that the output of the cover sensor 309 is Low (not opened), proceeds to S106 for judging whether the jammed medium has been extracted.

S106: Having judged that the cover is not opened, the controller 300 judges whether the output of the ejection sensor 118 is High or not (the presence or absence of the medium detected by the ejection sensor 118), upon judging that the output of the ejection sensor 118 is High (the medium is present), proceeds to S105 for judging whether the cover is opened, and upon judging that the output of the ejection sensor 118 is Low (the medium is absent), that is, the medium was extracted from the ejection port by the user, proceeds to S201 shown in FIG. 5 for proceeding with the recovery process.

S107: Having judged that the output of the cover sensor 309 is High (the cover is opened), upon detecting that the output of the cover sensor 309 is Low (the cover is closed), the controller 300 proceeds to S108, and on the other hand, upon detecting that the output of the cover sensor 309 is High (the cover remains open), maintains its state until detecting that the output of the cover sensor 309 is Low (the cover is closed).

S108: Having detected that the cover is closed, the controller 300 performs the initial operation of the POS printer 1, judges whether any error has occurred, upon judging that an error has occurred, proceeds to S109 for performing the error process, and upon judging that no error has occurred, proceeds to S110 for resuming the printing.

S109: In order to resolve the error that has occurred, the controller 300 performs the recovery process corresponding to the error and ends this process.

S110: Having judged that no error has occurred, the controller 300 turns the error lamp 312 off, starts a reprinting operation, and ends this process.

Figure 5:
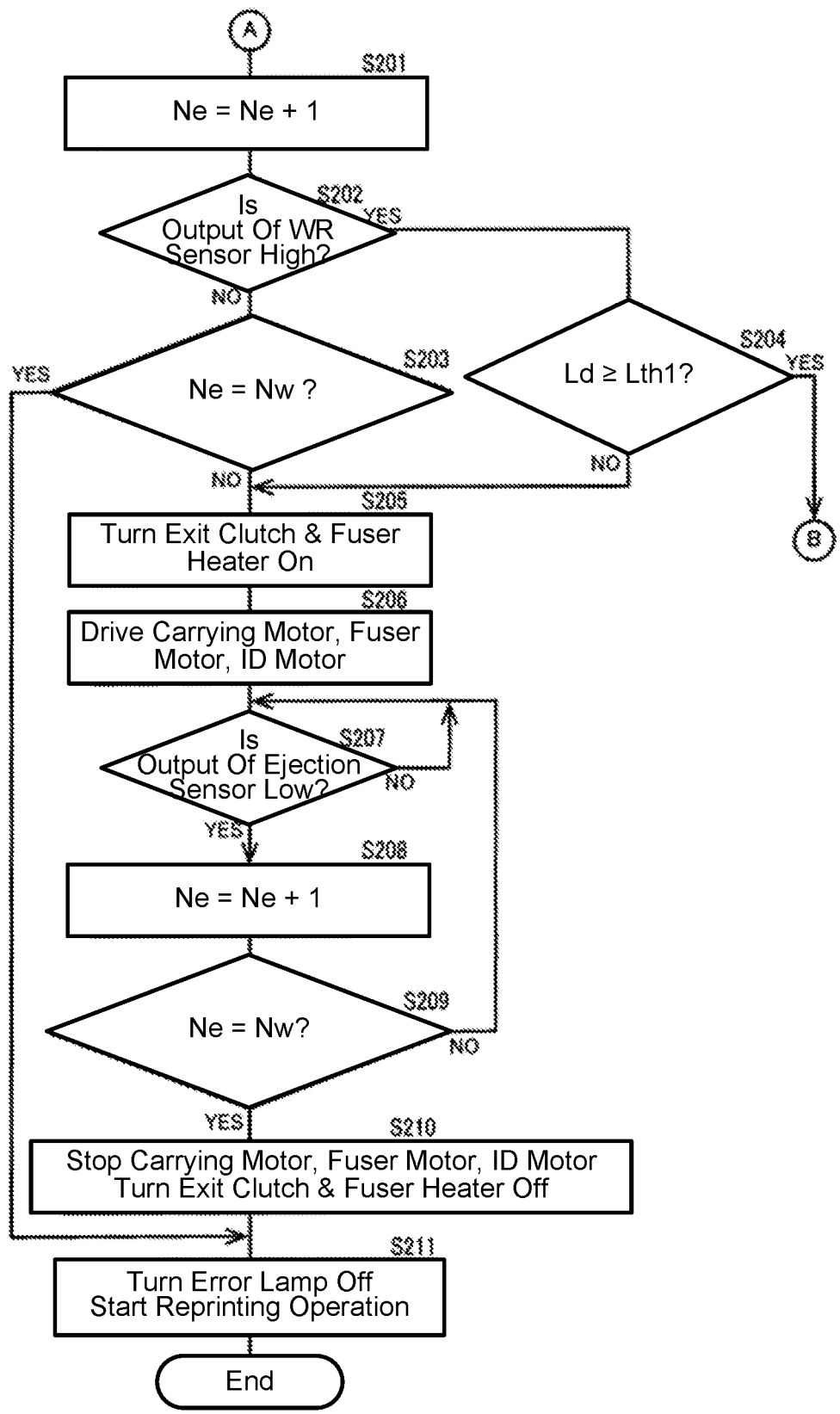
FIG. 5 is a flow chart showing the flow of the recovery process after extracting the medium in the embodiment.

Next, the recovery process performed by the POS printer after the medium could be extracted is explained referring to FIGS. 1 and 3 according to steps indicated with S in a flow chart showing the flow of the recovery process after extracting the medium in the embodiment in FIG. 5.

S201: Having judged that the medium was extracted in S106 in FIG. 4, the controller 300 of the POS printer 1 adds "1" to the ejection sensor passed number of sheets Ne for updating the number of sheets of the medium that passed the ejection sensor 118.

S202: The remaining medium detection part 321 of the controller 300 judges whether the output of the WR sensor 110 is High or not (whether the medium is present on the WR sensor 110 or not), upon judging that the output of the WR sensor 110 is High (the medium is present on the WR sensor), proceeds to S204, and upon judging that the output of the WR sensor is Low (the medium is absent on the WR sensor 110), proceeds to S203.

S203: Having judged that the medium was absent on the WR sensor 110, the remaining medium detection part 321 of the controller 300 compares the ejection sensor passed number of sheets Ne and the WR sensor passed number of sheets Nw, and judges whether they match or not.

If the remaining medium detection part 321 judges that they match (the ejection sensor passed number of sheets Ne=the WR sensor passed number of sheets Nw), the recovery process selection part 322 of the controller 300 interprets that no medium remains in the downstream side of the WR sensor 110 in the medium carrying direction and proceeds to S211, and if the remaining medium detection part 321 judges that they do not match (the ejection sensor passed number of sheets Ne≠the WR sensor passed number of sheets Nw), the recovery process selection part 322 of the controller 300 interprets that the medium remains in the downstream side of the WR sensor 110 in the medium carrying direction and proceeds to S205.

Figure 7:
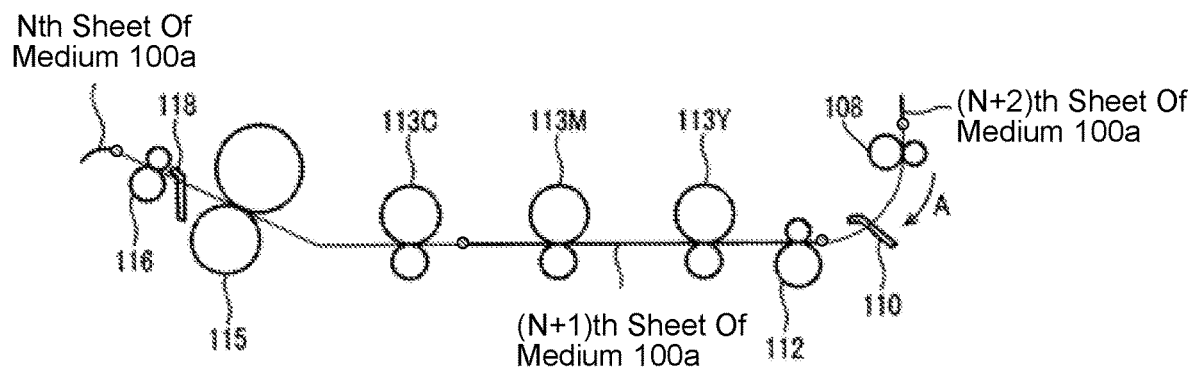
FIG. 7 is an explanatory diagram of a medium state in the embodiment.

Listed as the case where the medium is absent on the WR sensor 110, as shown in FIG. 7 for example, is a case where the Nth sheet of the medium 100*a* is extracted from the ejection port, the (N+1)th sheet of the medium 100*b* is present between the WR sensor 110 and the ejection sensor 118, and the (N+2)th sheet of the medium 100*c* is not sandwiched by the feed roller pair 108. Note that occasionally the medium may be absent between the WR sensor 110 and the ejection sensor 118. In order to distinguish edges of the sheets from the medium carrying path, dots are added at their leading edges and trailing edges in FIGS. 7-9.

Therefore, the remaining medium detection part 321 of the controller 300 compares the ejection sensor passed number of sheets Ne and the WR sensor passed number of sheets Nw, and judges whether they match or not, thereby judging whether the medium is present in the downstream side of the WR sensor 110 in the medium carrying direction indicated with an arrow A in the figure.

S204: On the other hand, if the remaining medium detection part 321 judges that the medium is present on the WR sensor 110 in S202, the recovery process selection part 322 of the controller 300 judges whether a carrying distance Ld of the medium derived by the remaining medium detection part 321 based on the output of the WR sensor 110 is no smaller than a prescribed distance Lth1 as a threshold value, upon judging that the carrying distance Ld of the medium is no smaller than the prescribed distance Lth1, interprets that the medium needs to be cut and proceeds to S301 shown in FIG. 6, and upon judging that the carrying distance Ld of the medium is smaller than the prescribed distance Lth1, interprets that the medium need not be cut and proceeds to S205.

Figure 8:
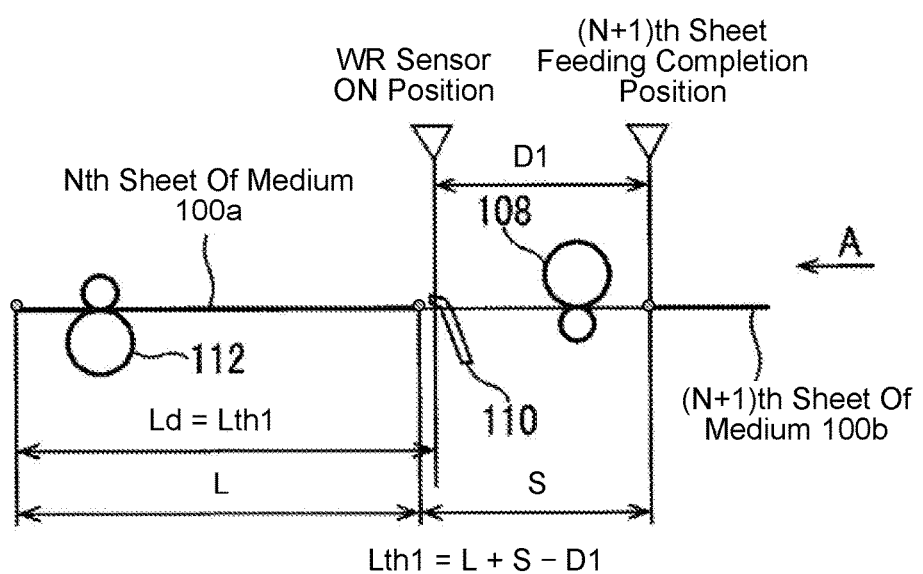
FIG. 8 is an explanatory diagram of a distance Lth1 in the embodiment.

Here, the distance Lth1 is explained based on FIG. 8.

FIG. 8 is an explanatory diagram of the distance Lth1 in the embodiment, where the medium carrying route between the feed roller pair 108 and the belt roller pair 112 shown in FIG. 1 is schematically depicted.

In FIG. 8 the distance Lth1 is the carrying distance from the point of time when the leading edge of the Nth sheet of the medium 100*a* that was cut by the cutter unit 107 and carried by the feed roller pair 108 and the belt roller pair 112 shown in FIG. 1 passes the WR sensor 110 to the point of time when the carrying of the uncut (N+1)th sheet of the medium 100*b* is started at the sheet feeding completion position. That is, when the leading edge of the Nth sheet of the medium 100*a* is carried by the distance Lth1 or more from the point of time when it passed the WR sensor 100, the leading edge of the uncut (N+1)th sheet of the medium 100*b* is carried downstream side in the medium carrying direction from the sheet feeding completion position.

If the sheet length of the Nth sheet of the medium 100*a* that is its length in the medium carrying direction indicated with an arrow A in the figure is denoted as L, the inter-sheet distance in the medium carrying direction as S, and the distance from the position where the medium can be detected by the WR sensor 110 to the sheet feeding completion position of the next (N+1)th sheet of the medium 100*b* as D1, their relationship is expressed by the following equation.

$$\text{Distance } Lth1 = \text{Sheet length } L + \text{Inter-sheet distance } S - \text{Distance } D1 \qquad \text{(Eq.)}$$

In the POS printer 1 of this embodiment, at the point of time when the Nth sheet of the medium 100*a* is carried by the distance Lth1 after the passage of its leading edge is detected by the WR sensor 110, the carrying clutch 302 turns on (connected), and the carrying of the (N+1)th sheet of the medium 100*b* is started.

Figure 9:
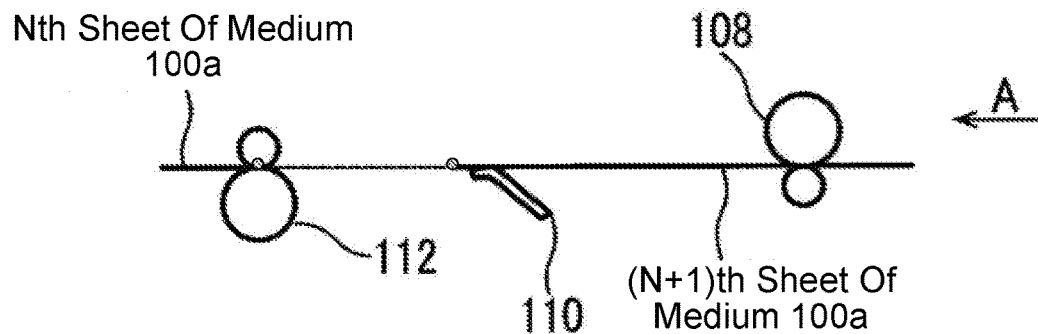
FIG. 9 is an explanatory diagram of a medium state in the embodiment.

Therefore, if the carrying distance Ld of the Nth sheet of the medium 100*a* after the passage of the leading edge of the medium 100*a* is detected by the WR sensor 110 is no smaller than the distance Lth1, as shown in FIG. 9, the carrying of the (N+1)th sheet of the medium 100*b* has been started, the medium 100*b* needs to be cut.

In this manner, according to the remaining state of the medium, the recovery process selection part 322 of the controller 300 selects either the process to eject the medium or the process to cut and eject the medium.

S205: In order to eject the medium remaining inside the POS printer 1, the controller 300 first turns the exit clutch 306 and the fuser heater 311 on, connects the ejection roller pair 116 with the fuser motor 305, and also starts applying heat to the fuser roller pair 115.

S206: The controller 300 drives the carrying motor 301, the fuser motor 305, and the ID motor 307 to carry the medium remaining inside the POS printer 1 to the ejection port.

S207: The controller 300 judges whether it has been detected that the output of the ejection sensor 118 had changed from High to Low, that is, whether the medium had passed the ejection sensor 118, upon judging that it has been detected, proceeds to S208, and upon judging that it has not been detected, continues monitoring the change in the output of the ejection sensor 118.

S208: Having detected that the medium had passed the ejection sensor 118, the controller 300 adds "1" to the ejection sensor passed number of sheets Ne.

S209: The controller 300 compares the ejection sensor passed number of sheets Ne and the WR sensor passed number of sheets Nw, judges whether they match or not, upon judging that they match (the ejection sensor passed number of sheets Ne=the WR sensor passed number of sheets Nw), interprets that no medium remains in the downstream side of the WR sensor 110 in the medium carrying direction and proceeds to S210, and upon judging that they do not match (the ejection sensor passed number of sheets Ne≠the WR sensor passed number of sheets Nw), interprets that the medium remains in the downstream side of the WR sensor 110 in the medium carrying direction and proceeds to S207.

S210: Having judged that no medium remained in the downstream side of the WR sensor 110 in the medium carrying direction, the controller 300 carries the medium that passed the ejection sensor 118 by the distance of the margin a that is a distance for ejecting it to the outside of the POS printer 1, afterwards stops driving the carrying motor 301, the fuser motor 305, and the ID motor 307, and turns the exit clutch 306 and the fuser heater 311 off S211: The controller 300 turns the error lamp 312 off, starts the reprinting operation, and ends this process.

In this manner, if the medium remains inside the POS printer 1 and the medium need not be cut, the recovery process selection part 322 of the controller 300 selects the process to eject the medium.

Figure 6:
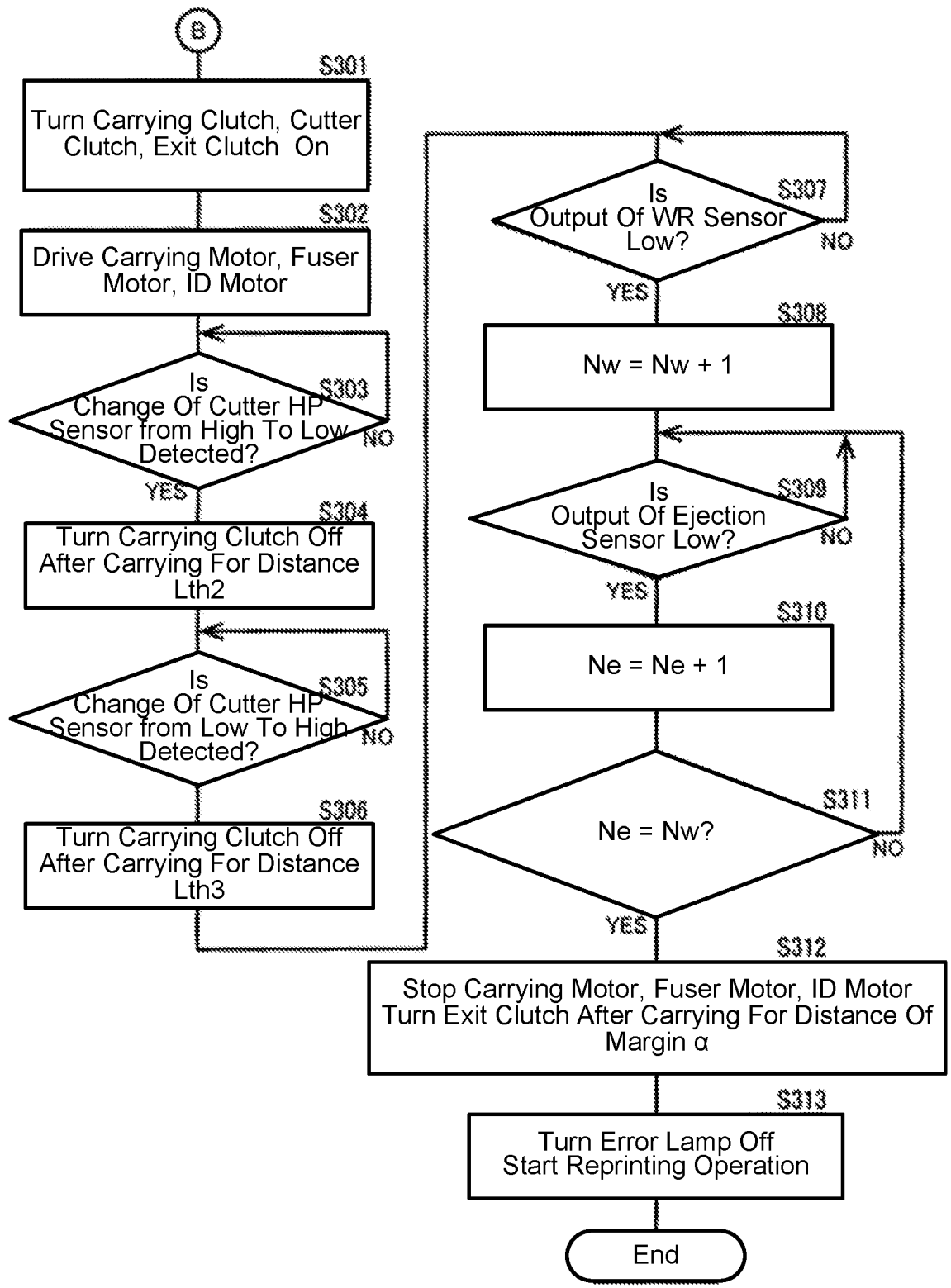
FIG. 6 is a flow chart showing the flow of the recovery process when the medium needs to be cut in the embodiment.

Next, the recovery process performed by the POS printer when the medium needs to be cut is explained referring to FIGS. 1, 2, and 3 according to steps indicated with S in a flow chart showing the flow of the recovery process when the medium needs to be cut in the embodiment in FIG. 6.

S301: Having judged that the medium needed to be cut in S204 in FIG. 5, in order to cut and eject the medium remaining inside the POS printer 1, the controller 300 of the POS printer 1 first turns on the carrying clutch 302, the cutter clutch 303, and the exit clutch 306 to connect the carrying motor 301 with the sheet feeding roller pairs 101, 102, 105, and 106, and the cutter unit 107, and the ejection roller pair 116 with the fuser motor 305.

S302: The controller 300 drives the carrying motor 301, the fuser motor 305, and the ID motor 307 to start carrying the medium 100, and also starts rotating the rotary blade 201 of the cutter unit 107 shown in FIG. 2.

S303: The controller 300 monitors the output of the cutter HP sensor 204 until it changes from High to Low, and upon detecting that it has changed from High to Low, proceeds to S304.

S304: Upon detecting that the output of the cutter HP sensor 204 has changed from High to Low, the controller 300 carries the medium 100 for a predetermined distance Lth2, afterwards turns the carrying clutch 302 off, and cuts (or disconnects) the carrying motor 301 from the sheet feeding roller pairs 101, 102, 105, and 106.

The distance Lth2 is a distance for carrying the leading edge of the cut medium 100 to the sheet feeding completion position after cutting the medium 100 by the cutter unit 107. Therefore, once the cut medium 100 has been carried by the distance Lth2, the controller 300 turns off the carrying clutch 302 to stop the medium 100.

Figure 10:
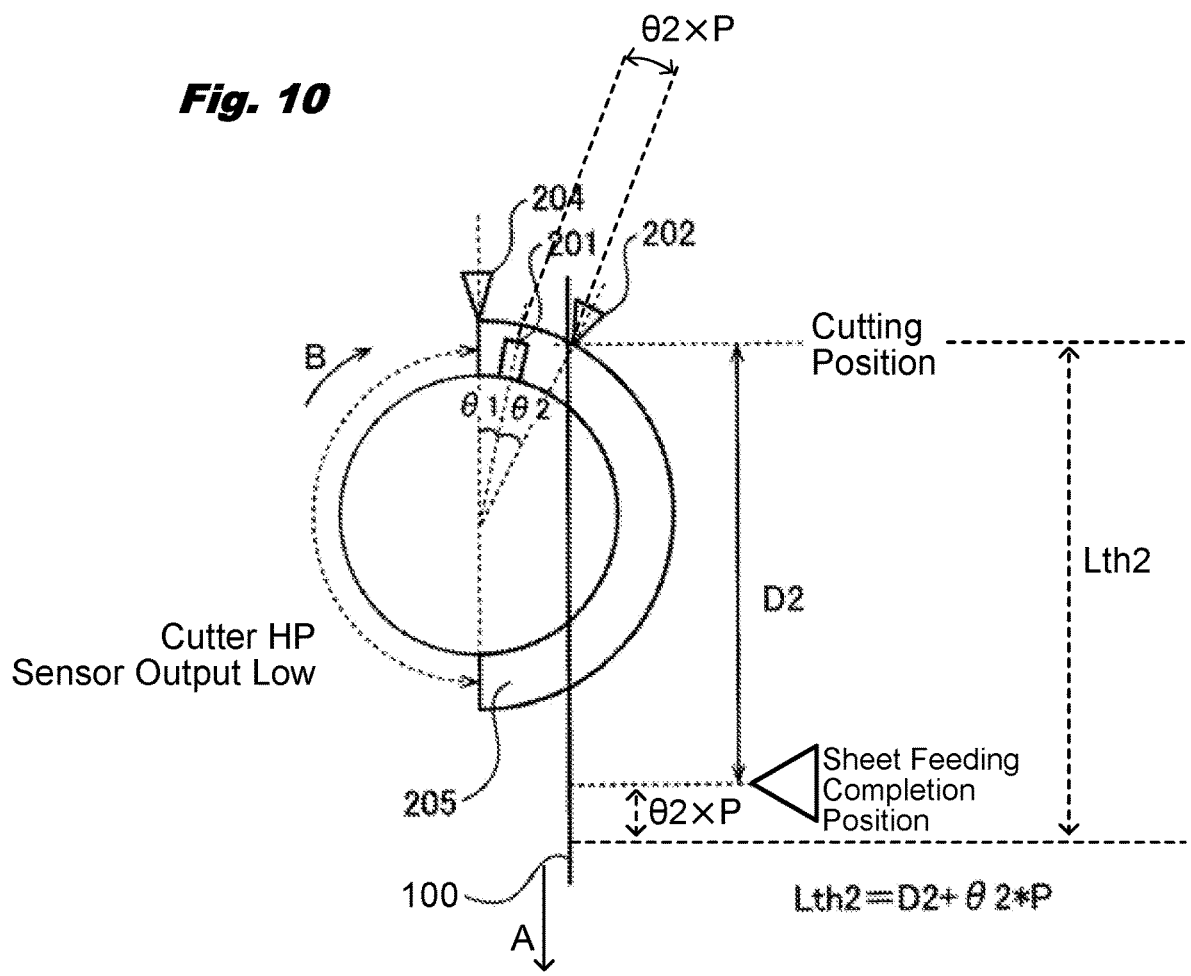
FIG. 10 is an explanatory diagram of a cutter operation in the embodiment.

As shown in FIG. 10, in a state where the output of the cutter HP sensor 204 has changed from High to Low, if the distance from the position where the fixed blade 202 and the rotary blade 201 touch each other, that is the position to cut the medium 100 (or cutting position), to the sheet feeding completion position is denoted as D2, the angle formed by the rotary blade 201 and the fixed blade 202 as θ2, and the carried amount of the medium 100 per unit rotation angle of the light blocking plate 205 as P, the distance Lth2 is expressed by Eq. 1.

$$Lth2 = D2 + \theta 2 \times P \qquad (Eq. 1)$$

Note that θ1 in the figure is the angle formed by the trailing edge of the light blocking plate 205 in the rotation direction indicated with an arrow B in the figure and the rotary blade 201, and an arrow A in the figure indicates the medium carrying direction.

In this manner, upon detecting that the output of the cutter HP sensor 204 has changed from High to Low, the controller 300 carries the medium 100 by the predetermined distance Lth2, afterwards turns off the carrying clutch 302, carries the leading edge of the cut medium 100 to the sheet feeding completion position, and stops it. Herein, the cut medium means a medium that is located at the upstream side from a portion where to be cut. Accordingly, by cutting the medium, two cut media are created. One cut medium is positioned at the downstream side from the cutting portion and ejected in the recovery process. On the other hand, the other cut medium is positioned at the upstream side from the cutting portion and remain on the carrying path after the recovery process. The other cut medium may be defined as a following medium.

In this manner, by carrying the leading edge of the following medium to the sheet feeding completion position and stopping it, resetting the medium by the user can become unnecessary, reducing the burden imposed on the user.

S305: The controller 300 monitors the output of the cutter HP sensor 204 until it changes from Low to High, and upon detecting that it has changed from Low to High, proceeds to S306.

S306: After detecting that the output of the cutter HP sensor 204 has changed from Low to High, the controller 300 rotates the carrying motor 301 by the rotation amount corresponding to carrying the medium 100 for a predetermined distance Lth3, afterwards turns the cutter clutch 303 off, and cuts off the carrying motor 301 and the cutter gear 203 (rotary blade 201) of the cutter unit 107. Note that because the carrying clutch 302 is off at this time, the medium 100 is not carried.

The distance Lth3 is a carried distance from the time of detecting that the output of the cutter HP sensor 204 has changed from Low to High to the time of turning off the cutter clutch 303 for stopping the rotary blade 201 of the cutter unit 107 at the cutter waiting position.

Figure 11A:
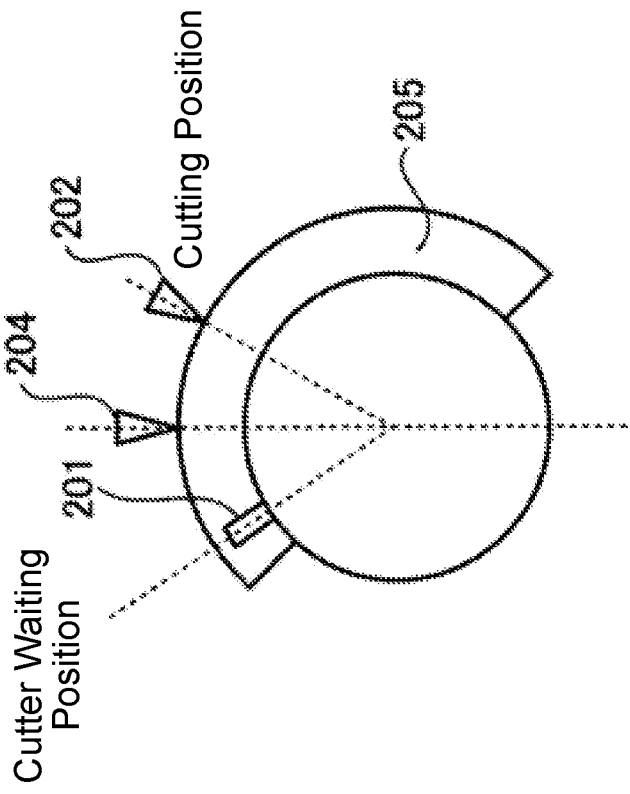
FIGS. 11A and 11B are explanatory diagrams of the cutter operation in the embodiment.

As shown in FIG. 11A, in a state where the leading edge of the light blocking plate 205 is disposed at a position detected by the cutter HP sensor 204 in the rotation direction indicated with an arrow B in the figure, if the angle formed by the trailing edge of the light blocking plate 205 in the rotation direction indicated with the arrow B in the figure and the rotary blade 201 is denoted as θ1, and the angle formed by the trailing edge of the light blocking plate 205 and the cutter waiting position of the rotary blade 201 as θ3, the distance Lth3 is expressed by Eq. 2.

$$Lth3 = (\theta 3 - \theta 1) \times P \qquad (Eq. 2)$$

Note that P is the carried amount of the medium 100 per unit rotation angle of the light blocking plate 205.

Figure 11B:
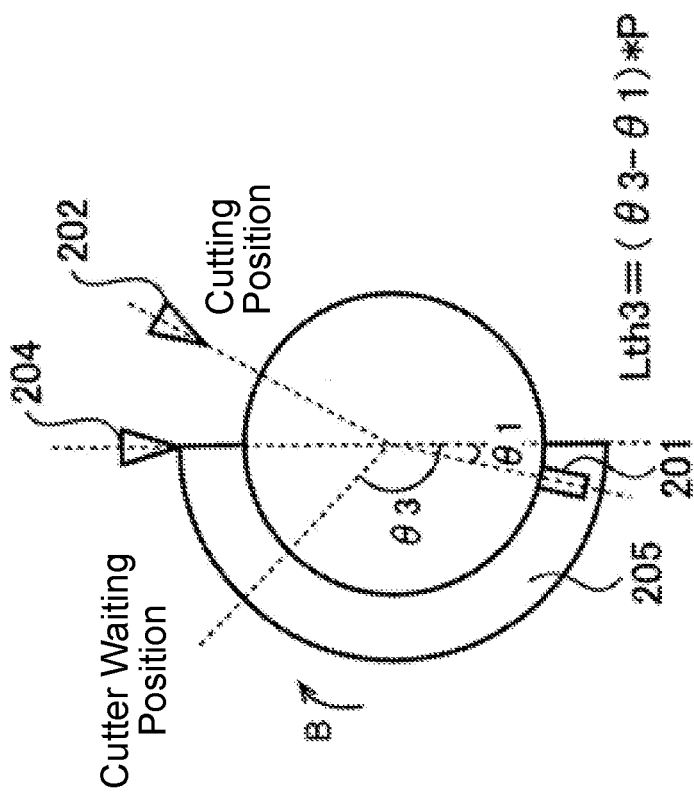

After detecting that the output of the cutter HP sensor 204 has changed from Low to High, the controller 300 rotates the carrying motor 301 by the rotation amount necessary for carrying the medium 100 by the predetermined distance Lth3, afterwards turns off the cutter clutch 303, and as shown in FIG. 11B, stops the rotary blade 201 of the cutter unit 107 at the cutter waiting position.

S307: The controller monitors the output of the WR sensor 101 until it changes from High to Low, upon detecting that it has changed from High to Low, that is, detecting that the medium has passed the WR sensor 110, proceeds to S308, and upon judging that no such detection has been made, continues monitoring the change in the output of the WR sensor 110.

S308: Having detected that the medium had passed the WR sensor 110, the controller 300 adds "1" to the WR sensor passed number of sheets Nw.

S309: The controller 300 judges whether it has been detected that the output of the ejection sensor 118 had changed from High to Low, that is, that the medium had passed the ejection sensor 118, upon judging that it has been detected, proceeds to S310, and upon judging that it has not been detected, continues monitoring the change in the output of the ejection sensor 118.

S310: Having detected that the medium had passed the ejection sensor 118, the controller 300 adds "1" to the ejection sensor passed number of sheets Ne.

S311: The controller 300 compares the ejection sensor passed number of sheets Ne and the WR sensor passed number of sheets Nw, judges whether they match or not, upon judging that they match (the ejection sensor passed number of sheets Ne=the WR sensor passed number of sheets Nw), interprets that no medium remains in the downstream side of the WR sensor 110 in the medium carrying direction and proceeds to S312, and upon judging that they do not match (the ejection sensor passed number of sheets Ne≠the WR sensor passed number of sheets Nw), interprets that the medium remains in the downstream side of the WR sensor 110 in the medium carrying direction and proceeds to S309.

S312: Having judged that no medium remained in the downstream side of the WR sensor 110 in the medium carrying direction, the controller 300 carries the medium that passed the ejection sensor 118 for the distance of the margin a that is a distance for ejecting it to the outside of the POS printer 1, afterwards stops driving the carrying motor 301, the fuser motor 305, and the ID motor 307, and turns off the exit clutch 306.

S313: The controller 300 turns the error lamp 312 off, starts the reprinting operation, and ends this process.

In this manner, if the remaining medium detection part 321 detects the medium whose carried amount in the carrying part is no smaller than the prescribed carried amount, the recovery process selection part 322 of the controller 300 ejects the medium and also selects as the recovery process a process that cuts the medium fed by the sheet feeding part and ejects the cut medium.

As mentioned above, when the medium jam detection part 320 has detected a jam of the medium to be ejected through the ejection port by the carrying part, if the remaining medium detection part 321 detects the medium remaining in the carrying part, the controller 300 of the POS printer 1 of this embodiment selects a recovery process by the recovery process selection part 322 according to the remaining state of the medium detected by the remaining medium detection part 321, and ejects the remaining medium based on the selected recovery process. By ejecting the remaining medium in this manner, the burden imposed on the user when the medium is jammed can be reduced.

Note that although explanations were given supposing that the ID units in this embodiment dealt with toners of 3 colors, they can also deal with toners of 2 or fewer colors, or 4 or more colors.

As explained above, in this embodiment, when the medium jam detection part has detected a jam of the medium to be ejected through the ejection port by the carrying part, if the remaining medium detection part detects the medium remaining in the carrying part, the POS printer selects a recovery process by the recovery process selection part according to the remaining state of the medium, and ejects the remaining medium based on the selected recovery process, thereby providing an efficacy that the burden imposed on the user when the medium is jammed can be reduced.

Note that although explanations were given supposing that the image forming apparatus was a POS printer in this embodiment, this invention is not limited to it, but it can be a printer, a facsimile machine, or a multifunction peripheral (MFP) as far as it has a function to eject a medium. Also, although explanations were given supposing that the image forming apparatus was an electrophotographic color printer, it can also be a monochromatic printer.

REFERENCE NUMERALS

1: POS printer
101, 102, 105, 106: Sheet feeding roller pairs
104: PE sensor
107: Cutter unit
108: Feed roller pair
110: WR sensor
111: Transfer belt
112: Belt roller pair
113Y, 113M, and 113C: ID units
114Y, 114M, and 114C: LED heads
115: Fuser roller pair
116: Ejection roller pair
118: Ejection sensor
201: Rotary blade
202: Fixed blade
204: Cutter HP sensor
300: Controller
301: Carrying motor
302: Carrying clutch
303: Cutter clutch
304: Belt motor
305: Fuser motor
306: Exit clutch
307: ID motor
308: High voltage circuit
309: Cover sensor
311: Fuser heater
312: Error lamp
320: Medium jam detection part
321: Remaining medium detection part
322: Recovery process selection part

What is claimed is:

1. An image forming apparatus carrying a medium along a carrying path in a medium carrying direction from an upstream side to a downstream side, comprising:
   a cutting part that cuts the medium carried along the carrying path,
   a carrying part that carries and ejects the medium cut by the cutting part, being located at the downstream side from the cutting part,
   a sheet feeding part that is disposed in the upstream side of the cutting part and feeds the medium to the cutting part,
   a medium jam detection part that detects a jamming of the medium to be ejected by the carrying part,
   a remaining medium detection part that detects whether or not the medium remains in the carrying part, the medium remaining being defined as a remaining medium,
   a recovery process selection part that selects a recovery process according to a remaining state of the medium, which is determined by the remaining medium detection part, and
   a controller that, when the medium jam detection part has detected the jamming of the medium, ejects the remaining medium based on the recovery process selected by the recovery process selection part, wherein
   the recovery process selection part selects the recovery process from at least two processes that are a first recovery process and a second recovery process,
   when the remaining medium detection part has detected the medium whose carried amount by the carrying part is equal to or smaller than a prescribed carried amount, the recovery process selection part selects the first recovery process such that the remaining medium is ejected without being cut,
   when the remaining medium detection part has detected the medium whose carried amount by the carrying part is no smaller than the prescribed carried amount, the recovery process selection part selects the second recovery process such that the remaining medium is cut first and ejected next.

2. An image forming apparatus carrying a medium along a carrying path in a medium carrying direction from an upstream side to a downstream side, comprising:
   a cutting part that cuts the medium carried along the carrying path,
   a carrying part that carries and ejects the medium cut by the cutting part, being located at the downstream side from the cutting part,
   a sheet feeding part that is disposed in the upstream side of the cutting part and feeds the medium to the cutting part,
   a medium jam detection part that detects a jamming of the medium to be ejected by the carrying part,
   a remaining medium detection part that detects whether or not the medium remains in the carrying part, the medium remaining being defined as a remaining medium,
   a recovery process selection part that selects a recovery process according to a remaining state of the medium, which is determined by the remaining medium detection part, and
   a controller that, when the medium jam detection part has detected the jamming of the medium, ejects the remaining medium based on the recovery process selected by the recovery process selection part,
   a first sensor that is disposed in the carrying part in the downstream side of the cutting part in the medium carrying direction and detects the medium such that a sheet number of the medium passing by the first sensor is counted, and
   a second sensor that is disposed in the downstream side of the first sensor in the medium carrying direction and detects the medium to be ejected such that another sheet number of the medium passing by the second sensor is counted, wherein
   the recovery process selection part selects either a process to elect the remaining medium or a process to cut and eject the remaining medium according to the remaining state of the medium,
   when the remaining medium detection part has detected the medium whose carried amount by the carrying part is no smaller than a prescribed carried amount, the recovery process selection part ejects the remaining medium and also selects, as the recovery process, a process that cuts the remaining medium fed by the sheet feeding part and ejects the cut medium, and
   the remaining medium detection part determines either a presence or absence of the remaining medium based on the sheet numbers detected by the first sensor and the second sensor.

3. The image forming apparatus according to claim 2, wherein
   the remaining medium detection part determines the carried amount of the medium carried by the carrying part based on a distance between a leading edge of the carried medium and the first sensor along the carrying path.

4. The image forming apparatus according to claim 2, wherein
   the medium jam detection part determines the jamming of the medium based on an output of the second sensor.

5. An image forming apparatus, comprising:
   a feeding part that feeds a contiguous medium along a carrying path in a medium carrying direction from an upstream side to a downstream side,
   a cutting part that makes a cut on the medium such that a first sheet with predetermined length (L) is formed, and a trailing edge of the first sheet and a leading edge of a second sheet, which follows the first sheet, are generated by the cut,
   a carrying part that carries and ejects the first and second sheets, a length of the carrying part along the carrying path being longer than the length (L) of the first sheet,
   an image forming part that performs an image forming process through which an image is developed on the first sheet, the image forming part being placed at a section corresponding to the carrying part, and
   a sheet detection sensor that senses whether or not any one of the first and second sheets is present on the sheet detection sensor,
   a medium jam detection part that detects a jamming of the first sheet, occurring in the carrying path,
   a control part that controls the cutting part, the carrying part, the sheet detection sensor and the medium jam detection part, wherein
   the feeding part, the cutting part and the carrying part are positioned in this order along the carrying path toward the downstream side in the medium carrying direction, and the sheet detection sensor is placed at the downstream side with respect to the cutting part in the medium carrying direction,
   during the image forming process in a normal state where the jamming is not detected, the carrying part stops carrying the second sheet when the leading edge of the second sheet arrives at a sheet feeding completion position, and keeps carrying the first sheet for the image forming process until a distance between the leading edge of the second sheet and the trailing edge of the first sheet becomes equal to an inter-sheet distance (S),
   in a jamming state where the jamming is detected, the control part
      calculates a carrying distance (Ld) of the first sheet, which is determined as a distance between a leading edge of the first sheet and the sheet detection sensor along the carrying path, based on an output of the sheet detection sensor,
      determines whether or not the carrying distance (Ld) is equal to or larger than a threshold value (Lth1) when the sheet detection sensor detects the first sheet, herein the threshold value (Lth1) satisfies follow:

$$Lth1 = L + S - D1$$

L is the length of the first sheet
   S is the inter-sheet distance
   D1 is a distance between the sheet feeding completion position and the sheet detection sensor,
   when the carrying distance (Ld) is equal to or larger (Yes), the control part causes the cutting part to make the cut so that a leading section of the second sheet, which is projecting from the cutting part toward the downstream side, is cut, then causes the carrying part to carry the first sheet and the leading section of the second sheet to eject,
   when the carrying distance (Ld) is not (No), the control part does not cause the cutting part to make the cut, and causes the carrying part to carry only the first sheet to eject.

6. The image forming apparatus of claim 5, further comprising:

another sheet detection sensor that senses whether or not any one of the sheets is present on the another sheet detection sensor, wherein the sheet detection sensor is defined as a first detection sensor, and being placed at the upstream side with respect to the image forming part, the another sheet detection sensor is defined as a second detection sensor, and being placed at the downstream side with respect to the image forming part, the control part determines that the jamming occurs when the second detection sensor does not sense the trailing edge of the first sheet within a prescribed period after the leading edge of the first sheet is sensed, and when the jamming is determined and the first detection sensor does not sense any one of the sheets, the control part keeps causing the carrying part to drive until the second detection sensor does not sense any one of the sheets.

7. The image forming apparatus of claim 6, wherein the first detection sensor counts a first sheet number (Nw) of the sheets that pass the first detection sensor at every time of the image forming process, the second detection sensor counts a second sheet number (Ne) of the sheets that pass the second detection sensor at every time of the image forming process, when the jamming is determined, the control part suspends the image forming process, when the second detection sensor does not sense any one of the sheets, the control part increments the second sheet number, and the control part resumes the suspended image forming process when the second sheet number, which was incremented, is equal to the first sheet number.

8. The image forming apparatus according to claim 1, wherein when the remaining medium is cut by the cutting part in the second recovery process, a trailing edge of the cut medium and a leading edge of a following medium, which is located at the upstream side from the cut medium, are created, and the controller causes the carrying part to carry the leading edge of the following medium to a sheet feeding completion position where the following medium is ready for an image forming process.

\* \* \* \* \*